US012003531B2

(12) United States Patent
Medvedovsky et al.

(10) Patent No.: US 12,003,531 B2
(45) Date of Patent: *Jun. 4, 2024

(54) QUANTILE REGRESSION ANALYSIS METHOD FOR DETECTING CYBER ATTACKS

(71) Applicant: Radware Ltd., Tel Aviv (IL)

(72) Inventors: Lev Medvedovsky, Netanya (IL); David Aviv, Tel Aviv (IL)

(73) Assignee: Radware Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,227

(22) Filed: Apr. 5, 2023

(65) Prior Publication Data
US 2023/0254341 A1 Aug. 10, 2023

Related U.S. Application Data

(63) Continuation of application No. 17/139,066, filed on Dec. 31, 2020, now Pat. No. 11,652,843.

(51) Int. Cl.
*H04L 9/40* (2022.01)
*G06F 17/18* (2006.01)

(52) U.S. Cl.
CPC .......... *H04L 63/1458* (2013.01); *G06F 17/18* (2013.01); *H04L 63/1425* (2013.01); *H04L 63/1433* (2013.01)

(58) Field of Classification Search
CPC ............. H04L 63/1458; H04L 63/1425; H04L 63/1433; G06F 17/18
See application file for complete search history.

(56) References Cited

U.S. PATENT DOCUMENTS

| 10,685,018 | B1 | 6/2020 | Blatt et al. | |
| 11,184,401 | B2 * | 11/2021 | Crabtree | G06F 16/2477 |
| 11,201,890 | B1 * | 12/2021 | Coull | G06F 21/554 |
| 11,212,303 | B1 * | 12/2021 | Shah | G06Q 50/01 |
| 2005/0111367 | A1 | 5/2005 | Chao et al. | |
| 2007/0280114 | A1 * | 12/2007 | Chao | H04L 63/1458 370/252 |

(Continued)

OTHER PUBLICATIONS

Siffer et al., "Netspot: A Simple Intrusion Detection System with Statistical Learning" Dec. 1, 2020, 2020 IEEE 19th International Conference on Trust, Security and Privacy in Computing and Communications (TrustCom) (pp. 911-918) (Year: 2020).*

*Primary Examiner* — Stephen T Gundry
(74) *Attorney, Agent, or Firm* — M&B IP Analysts, LLC

(57) ABSTRACT

A system and method for detecting cyber-attacks using quantile regression analysis are disclosed. The method includes: identifying at least one hit quantile out of a plurality of quantiles, wherein the at least one identified hit quantile falls within quantile edges of a sample of traffic directed at a protected entity, wherein each of the plurality of quantiles is characterized by a probability distribution of at least one feature of a data stream, each of the plurality of quantiles having a respective probability estimate; updating the probability estimates of the plurality of quantiles when the at least one hit quantile has been identified; and when the probability estimate of the at least one hit quantile is above a threshold, taking an action to mitigate existence of a cyber-attack.

19 Claims, 7 Drawing Sheets

(56) References Cited

U.S. PATENT DOCUMENTS

| | | | |
|---|---|---|---|
| 2009/0138238 A1* | 5/2009 | Bakshi | G06F 17/18 |
| | | | 702/180 |
| 2017/0230392 A1 | 8/2017 | Dean et al. | |
| 2018/0270266 A1 | 9/2018 | Zoldi et al. | |
| 2020/0195673 A1 | 6/2020 | Lee | |
| 2020/0364607 A1* | 11/2020 | BahenaTapia | G06N 7/01 |
| 2021/0037028 A1 | 2/2021 | Brown et al. | |
| 2021/0152571 A1 | 5/2021 | Varnavas et al. | |
| 2021/0194903 A1 | 6/2021 | Medvedovsky et al. | |
| 2021/0243210 A1 | 8/2021 | Bernardi et al. | |
| 2021/0306358 A1 | 9/2021 | Luo et al. | |
| 2021/0390455 A1* | 12/2021 | Schierz | G06N 5/04 |
| 2021/0406671 A1* | 12/2021 | Gasthaus | G06F 40/20 |
| 2022/0014556 A1* | 1/2022 | Crabtree | H04L 63/1425 |
| 2022/0014560 A1* | 1/2022 | Crabtree | H04L 63/1433 |
| 2022/0014561 A1* | 1/2022 | Caceres | G06F 16/951 |
| 2022/0060511 A1* | 2/2022 | Crabtree | G06F 16/951 |
| 2022/0131890 A1* | 4/2022 | Shukla | G06F 21/552 |
| 2022/0147816 A1* | 5/2022 | Yanagisawa | G06N 3/04 |
| 2022/0159033 A1* | 5/2022 | Mizrahi | H04L 63/1441 |
| 2022/0166782 A1* | 5/2022 | Zoldi | H04L 63/1416 |
| 2022/0182493 A1* | 6/2022 | Ter | H04M 3/5238 |
| 2022/0191231 A1* | 6/2022 | Bashan | H04L 63/1433 |
| 2022/0201042 A1* | 6/2022 | Crabtree | G06F 16/2477 |
| 2022/0207135 A1* | 6/2022 | Jajoo | G06N 20/00 |
| 2022/0210200 A1* | 6/2022 | Crabtree | G06F 16/951 |
| 2022/0224723 A1* | 7/2022 | Crabtree | H04L 63/20 |

* cited by examiner

QUANTILE REGRESSION ANALYSIS METHOD FOR DETECTING CYBER ATTACKS

CROSS-REFERENCE TO RELATED APPLICATIONS

This application is a continuation of co-pending U.S. patent application Ser. No. 17/139,066, filed Dec. 31, 2020, which is herein incorporated by reference.

TECHNICAL FIELD

This present disclosure generally relates to techniques for protecting network and computing resources against cyber-attacks, and, specifically, to techniques for detecting cyber-attacks characterized by burst traffic and fast changing traffic patterns.

BACKGROUND

These days, on-line businesses and organizations are vulnerable to malicious attacks. Recently, cyber-attacks have been committed using a wide arsenal of attack techniques and tools targeting both the information maintained by the on-line businesses and their IT infrastructure. Hackers and attackers are constantly trying to improve their attack strategies to cause irrecoverable damage, overcome current deployed protection mechanisms, and so on.

A DoS/DDoS attack is an attempt to make a computer or network resource unavailable or idle. A common technique for executing DoS/DDoS attacks includes saturating a target victim resource (e.g., a computer, a WEB server, an API server, a WEB application, and the like), with external requests. As a result, the target victim becomes overloaded and it cannot respond properly to legitimate traffic.

Common DDoS attacks come in the form of sustained, high-volume traffic floods that ramp up gradually, reach a peak, and are then followed by either a lull or a sudden descent. In Burst attacks, also known as "hit-and-run DDoS", short bursts of high-volume attacks are used repeatedly at random intervals. Each short burst can last only a few seconds, while a burst attack campaign can span hours or even days. These attacks result at a high volume of traffic during a very short time interval toward its target. Another type of DDoS attack is the fast morphing DDoS attacks.

DDoS attacks are typically detected by learning, during peace time, the normal behavior of traffic toward the target. Any deviation from the normal behavior is determined as a potential attack. For example, normal behavior may be represented by a baseline and/or threshold (e.g., number of packets per second) whose value is learned and adapted over time. There are a number of solutions discussed in the related art for detection attacks and characterization attacks based on learning normal behavior of traffic.

Such solutions cope with relatively volumetric attacks even with significant daily traffic changes, but they are not sufficiently sensitive to detect attacks characterized by short bursts of traffic of any volume.

Therefore, burst attack traffic (also referred to as lower volume attacks "blips") cannot be detected by existing techniques for detecting high volume DoS/DDoS attacks, since sensitivity and response time of conventional techniques are too coarse.

It would be, therefore, advantageous to provide an efficient security solution for overcoming the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include a method for detecting cyber-attacks. The method comprises: identifying at least one hit quantile out of a plurality of quantiles, wherein the at least one identified hit quantile falls within quantile edges of a sample of traffic directed at a protected entity, wherein each of the plurality of quantiles is characterized by a probability distribution of at least one feature of a data stream, each of the plurality of quantiles having a respective probability estimate; updating the probability estimates of the plurality of quantiles when the at least one hit quantile has been identified; and when the probability estimate of the at least one hit quantile is above a threshold, taking an action to mitigate existence of a cyber-attack.

Some embodiments disclosed herein include a system for detecting cyber-attacks comprising: a processing circuitry; and a memory, the memory containing instructions that, when executed by the processing circuitry, configure the system to: identify at least one hit quantile out of a plurality of quantiles, wherein the at least one identified hit quantile falls within quantile edges of a sample of traffic directed at a protected entity, wherein each of the plurality of quantiles is characterized by a probability distribution of at least one feature of a data stream, each of the plurality of quantiles having a respective probability estimate; update the probability estimates of the plurality of quantiles when the at least one hit quantile has been identified; and when the probability estimate of the at least one hit quantile is above a threshold, take an action to mitigate existence of a cyber-attack.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
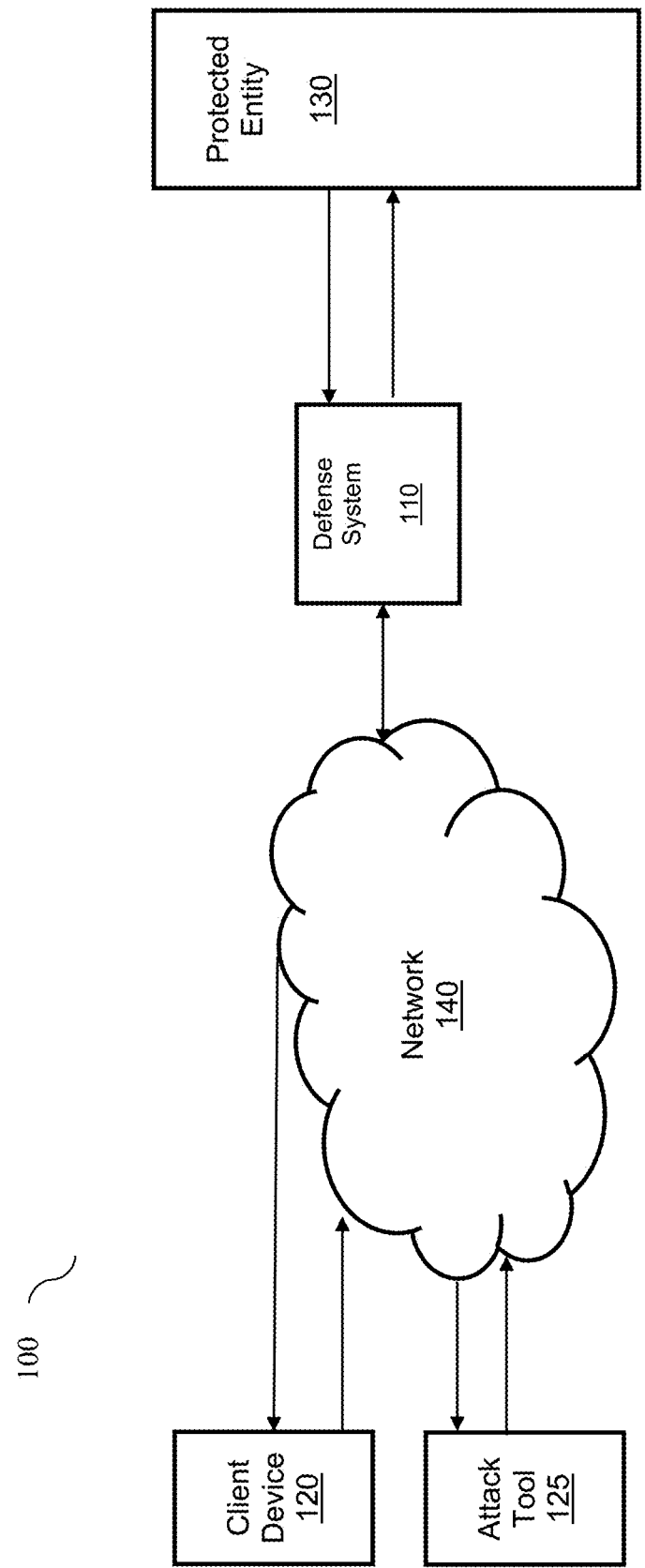
FIG. 1 is a schematic diagram illustrating a defense system utilized to describe the various embodiments.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a system and method for detecting cyber-attacks. In an example embodiment, the detected cyber-attacks are characterized by short bursts of traffic. In an embodiment, the detection method is based on a quantile regression analysis process. Such a process is designed to estimate, on-the-fly, the probability distribution of a data stream X(t) by dividing the stream into sub-streams (the sub-streams are hereinafter referred to as quantiles). In an example embodiment, dividing the data stream is performed based on a first feature (a primary feature A). That is, if i<j, then a value of a feature A of any item from the quantile number 'i' is less than the value A of any item from the quantile number 'j'. That is, each of the plurality of quantiles is characterized by a probability distribution of at least one feature of a data stream. Each of the plurality of quantiles having a respective probability estimate to be hit as equal as possible.

In an embodiment, the primary feature of each quantile is a source IP address (e.g., of a device generating requests constructing the data streams), and every quantile is updated only by samples having an IP address in a specific range. In a further embodiment, a secondary feature for each quantile is related to bandwidth, where the bandwidth attribute is any of a packet size, a request size, a response size, a flow size, and the like.

In peacetime (i.e., when no ongoing attack is detected), an average bandwidth is approximately the same in all quantiles, and the quantile edges are continuously updated to maintain this equality of average bandwidth. Thus, the probability of any byte to hit a quantile is kept as equal as possible for all quantiles. Accordingly, in peacetime, the probability estimate that a sample hits a quantile is approximately 1/N, where N is the number of quantiles.

When a quantile is under attack, the edges of the attacked quantile do not have enough time to adapt and, as a result, the corresponding probability estimate rapidly increases and crosses a threshold. At the same time, the probability estimates in all other quantiles decrease because the sum of the probability estimates is always one. Thus, an attack can be identified based on at least one quantile being higher than the other quantiles. A "hit" quantile is a quantile for which a value of a primary feature (e.g., an IP address) of an incoming sample is between the quantile edges. The probability estimate is a probability of an attack traffic "hitting" a quantile.

When an attacked quantile is determined as hit, the alarm state is declared and the contents of the attacked quantile are checked in order to characterize the attacker. It should be noted that multiple samples (from multiple sources) can fall into multiple attacked quantiles at the same time, thereby detecting attacks from multiple attackers. In an embodiment, the quantile edges are not updated upon entering the alarm state.

Due to the rapid changes in the probability estimates of the defined quantiles, the disclosed embodiments allow for detecting attacks and, in particular, DDoS attacks generated with short bursts of traffic, or by fast changing attack traffic patterns (fast morphing DDoS attacks). Existing cyber-security solutions fail to detect such attacks as they are based on basslines and thresholds designed to disregard significant momentary traffic rate oscillations, therefore a threshold is pretty high, and the threshold must be crossed several times before an attack is detected. This leads to insensitivity to burst traffic or changing traffic patterns.

According to the disclosed embodiments, the end of the attack is also detected based on the probability estimates of quantiles. When the attack ends, the probability estimate of an attacked quantile decreases exponentially with a relative rate that is independent of the attack intensity such that the end of the attack is detected, for example, when the probability estimates of all quantiles is about the same. Upon detecting the end of the attack, all probability estimates are reinitialized to a value of 1/N (again, where N is the number of quantiles) and updating of the quantile edges resumes.

According to another embodiment, a detected attack is characterized to identify the attacker. To this end, a list of suspicious IP addresses in each attacked quantile is generated, such list can be further analyzed to determine the source of the attack.

FIG. 1 is a schematic diagram 100 illustrating a defense system 110, utilized to describe the various embodiments. In the schematic diagram 100, client devices 120 and 125 communicate with a protected entity 130 over a network 140. In order to demonstrate the disclosed embodiments, the client device 120 is a legitimate client (operated by a real user), the client device 125 is an attack tool (operated, for example, by a bot), and the protected entity 130 is a "victim server", i.e., a protected entity 130 under attack.

The attack tool 125 carries out the malicious attacks against the protected entity 130. The attack tool 125 can be a dedicated tool for performing DoS/DDoS attacks ("collectively referred to "DoS attacks") such as those described above. The attack tool 125 can also execute attacks using high volume traffic. The attack can be carried over a transport-layer protocol (e.g., TCP, UDP, etc.) or an application-layer protocol (e.g., HTTP, HTTPs, etc.). An attack tool can be any infected client device.

It should be noted that the embodiments disclosed herein are applied when multiple attack tools execute the attacks against the protected entity 130 concurrently. Thus, the embodiments disclosed herein can also be used to detect and mitigate a large-scale attack campaign where a vast number of attack tools participate in attacking the protected entity 130. Similarly, vast numbers of legitimate client devices 120 can operate concurrently to be delivered with the services proposed by the protected entity 130. Both client devices 120 and 125 can reach the protected entity 130 concurrently.

The protected entity 130 is the entity to be protected from malicious threats. The protected entity 130 may be a physical or virtual entity (e.g., a virtual machine, a software container, a serverless function, and the like). The protected entity 130 may be an IoT device, a smartphone, a wearable device, a computer, a network node, a server, a storage device, or any device with an access to the network 140.

In some configurations, the protected entity 130 may be deployed in a datacenter or a cloud computing platform (not shown), on the premises of an organization, and the like. The cloud computing platform may be a private cloud, a public cloud, a hybrid cloud, or any combination thereof. In addition, the deployment shown in FIG. 1 may include a content delivery network (CDN), not shown, connected between the client 120 and the protected entity 130. Example cloud computing platforms include Amazon® Web Services (AWS), Cisco® Metacloud, Microsoft® Azure®, Google® Cloud Platform, HP® Cloud, and the like.

The network 140 may be, but is not limited to, a local area network (LAN), a wide area network (WAN), the Internet, a cellular network, a metropolitan area network (MAN), a wireless network, an IoT network, or any combination thereof. A cellular network may include a long-term evolution (LTE) network, a 5G network, and the like.

According to the disclosed embodiments, the defense system 110 is deployed in-line between the client devices 120 and 125 and the protected entity 130. The defense system 110 may be deployed in a cloud computing platform and/or in an on-premises deployment, or combined. The cloud computing platform may be, but is not limited to, a public cloud, a private cloud, or a hybrid cloud.

Figure 2A:
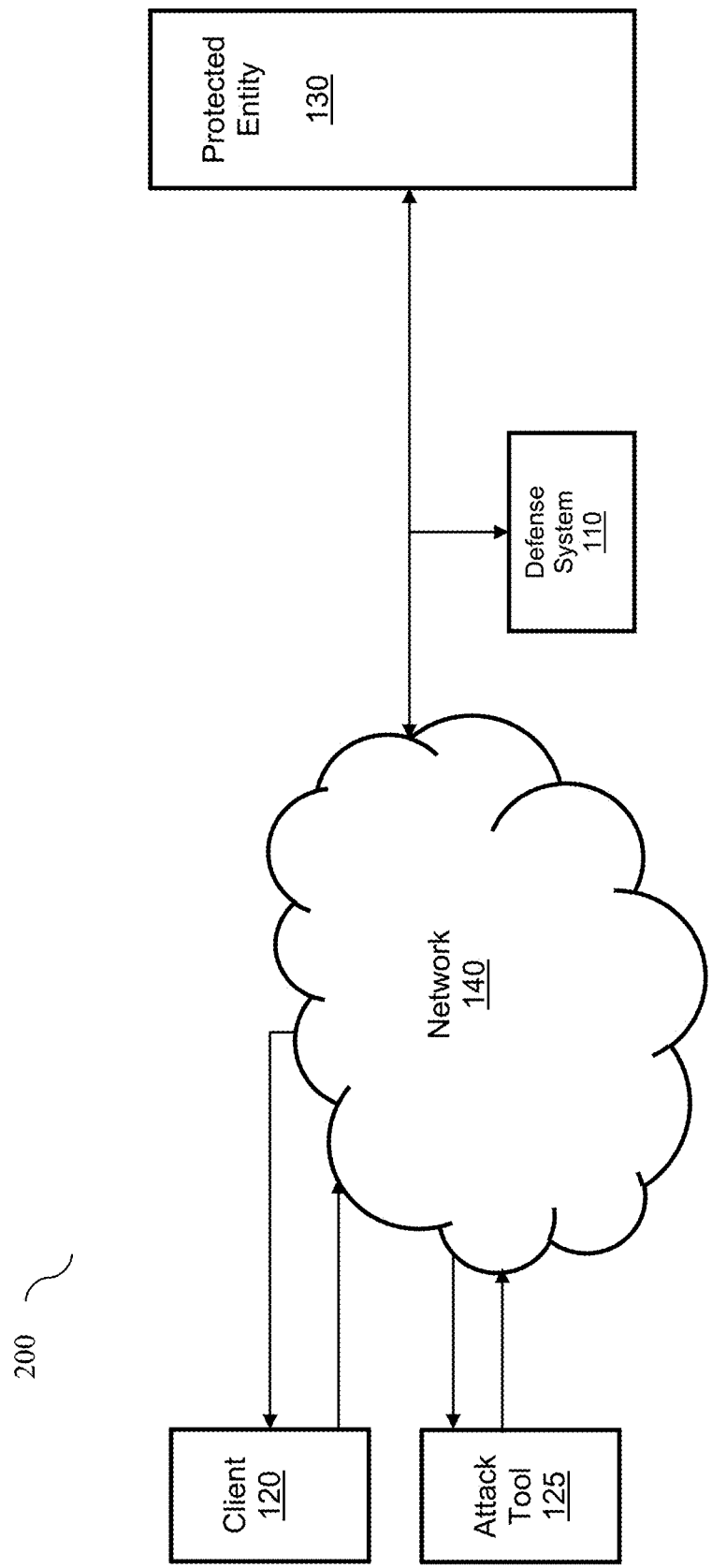
FIG. 2A is an illustration of an out-of-path deployment of the defense system according to an embodiment.

In an embodiment, when installed in the cloud computing platform, the defense system 110 may operate as a Software-as-a-Service (SaaS). In some configurations, the defense system 110 can also be deployed in a protection cloud platform as always-on protection. In some configurations, the defense system 110 is deployed at an edge network (not shown). An edge network may be communicatively connected between the client device and the protected entity 130. An edge network allows access to a plurality of computing resources, such as IoT devices, end-user devices, servers (virtual or physical) edge computing nodes, and virtual entities. The edge network may be a datacenter, an enterprise network, a private cloud, a public cloud, and the like In an alternative implementation illustrated in FIG. 2A, the defense system 110 may be deployed out-of-path of traffic between the client device 120, the attack tool 125, and the server 130.

Figure 2B:
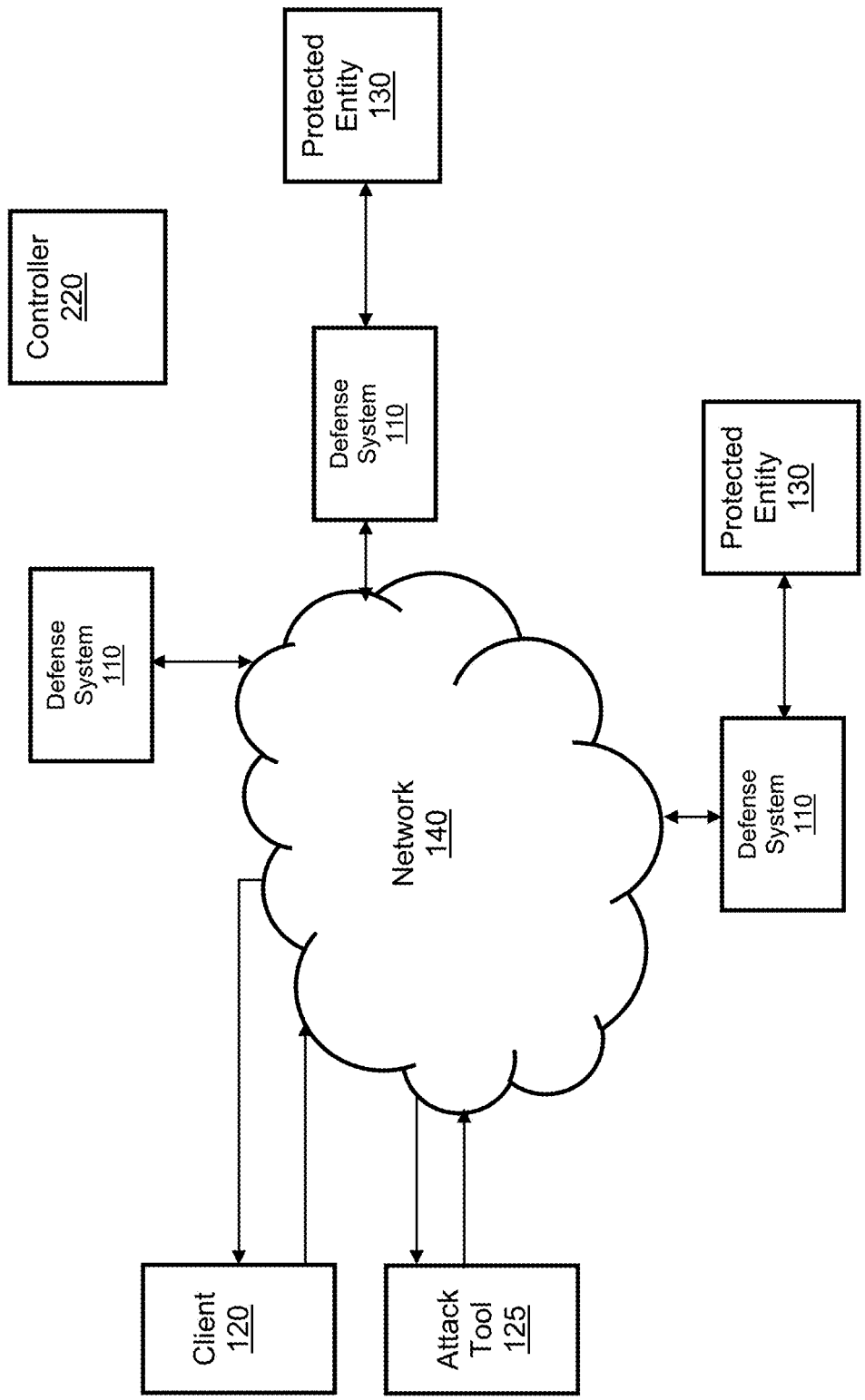
FIG. 2B is an illustration of a distributed deployment of the defense system according to an embodiment.

In another configuration, shown in FIG. 2B, the defense system 110 may be a distributed system connected in a number of locations to protect different protected entities 130 from different locations. In such a configuration, the defense system 110 may be controlled and/or orchestrated by a centralized controller 220.

The defense system 110 is a device, system, component, or the like, configured to provide for various functionalities including, without limitation, detection of cyber-attacks including DDoS attacks characterized by short bursts of any traffic volume, fast morphing DDoS attacks, and the like. The defense system 110 may be configured to execute one or more instructions, methods, and the like, including, without limitation, the processes described below. The defense system 110 can also be realized as software such as, but not limited to, a software application, service, microservice, and the like. The software is executed over hardware, such as those discussed below with reference to FIG. 6. Hereinafter the operation of the defense system 110 will be discussed with reference to FIG. 1.

According to the disclosed embodiments, the defense system 110 is configured to inspect traffic flows between the client device 120, the attack tool 125, and the protected entity 130 to detect and characterize DDoS attacks, and particularly DDoS attacks generated by short burst of traffic.

To this end, the defense system 110 is configured to perform quantile regression analysis. Such quantile regression analysis may be utilized to automatically and adaptively set policies and provide detection sensitivity for attacks with low traffic volume (e.g., as low as 1% of normal traffic), and attacks with fast changing traffic patterns. In addition, the quantile regression analysis allows for characterizing attackers once an attack is detected regardless of the attack scale.

The defense system 110 is configured to detect an anomaly in traffic behavior. Such an anomaly demonstrates a substantial change in the probability distribution of monitored and analyzed input parameters. Such input parameters may include, but are not limited to, a source or destination IP address, a packet request or packet response's size, and so on. Therefore, the proposed system provides an efficient way to reduce the false positives of attack detection.

In an embodiment, the defense system 110 operates in two phases when implementing the quantile regression analysis: a learning phase and a detecting (testing) phase. In an embodiment, the phases are not temporally distinct such that the learning continues also during the detection phase. The operation of the defense system 110 during the learning and detection phases are discussed in detail below.

The defense system 110 is further configured to characterize an attacker of any detected attack. The characterization of the attacker yields a suspected list of IP addresses that provided the most contribution to the increased bandwidth during a detected attack. The attacker characterization is discussed in greater detail below.

The defense system 110 is further configured to determine an end-of-attack event. This event signals when a detected attack is over. The event is generated when probability estimates in the attacked quantiles are decreasing exponentially. Determining an end-of-attack event is also discussed in detail below.

It should be noted that one client device 120, one attack tool 125, and one victim protected entity 130 are depicted in FIG. 1 merely for the sake of simplicity, and that the embodiments disclosed herein can be applied to a plurality of clients and servers. The clients may be in different geographical locations. The servers may be part of one or more datacenters, server frames, private clouds, public clouds, hybrid clouds, or combinations thereof.

To describe the operation of the quantile regression analysis, the following terms will be defined. The definitions should not be viewed as limiting the scope of the disclosed embodiments and the operation of the defense system 110, but merely provided for ease of the description.

A quantile s is characterized by a probability distribution of at least one feature of a data stream. Multiple quantiles having a respective probability estimate. Quantile regression is a process for estimating either the conditional median or other quantiles of a response variable.

A sample is a single packet, a request, a response, or any other portion of data of interest possessing at least two features: A and B. The features A and B can be referred to as primary and secondary, respectively.

A traffic rate is the quantity of data (e.g., in bytes) transferred in a given period of time (e.g., seconds). For example, a traffic rate in megabytes per second (MB/s) is the sum of sizes (in bytes) of all packets coming to a server during one second. A normal traffic rate is a random value, typical for peace time, with probability 1-RFP being less than a momentary or permanent threshold, where RFP is a required rate of false positive detections.

A normal state is a regular state of the disclosed method and occurs during peace time when the traffic rate is normal. In the normal state, one or more state variables are updated. The state variables include the edges of quantiles, the probability estimates of quantiles, and the thresholds. The normal state is characterized by small random oscillations of the probability estimates around their expected value of 1/N, where N is the number of quantiles.

An alarm state is declared when the threshold is crossed. In the alarm state, all state variables except the probability estimates of the quantiles are frozen. During alarm state, the probability estimates of hit quantiles increase, such that their expected values asymptotically approach to their limits depending on the attack intensity. The alarm state is likely caused by an attack, since under attack the probability distribution of samples changes faster than the quantile edges can be adapted. As such, attacks with erupted traffic can be detected faster than prior at solutions.

A threshold is a variable or constant value designed for distinguishing between the normal state and alarm state. If in the normal state, the probability estimate of at least one quantile sequentially exceeds the threshold, and then an alarm state is declared.

Figure 3:
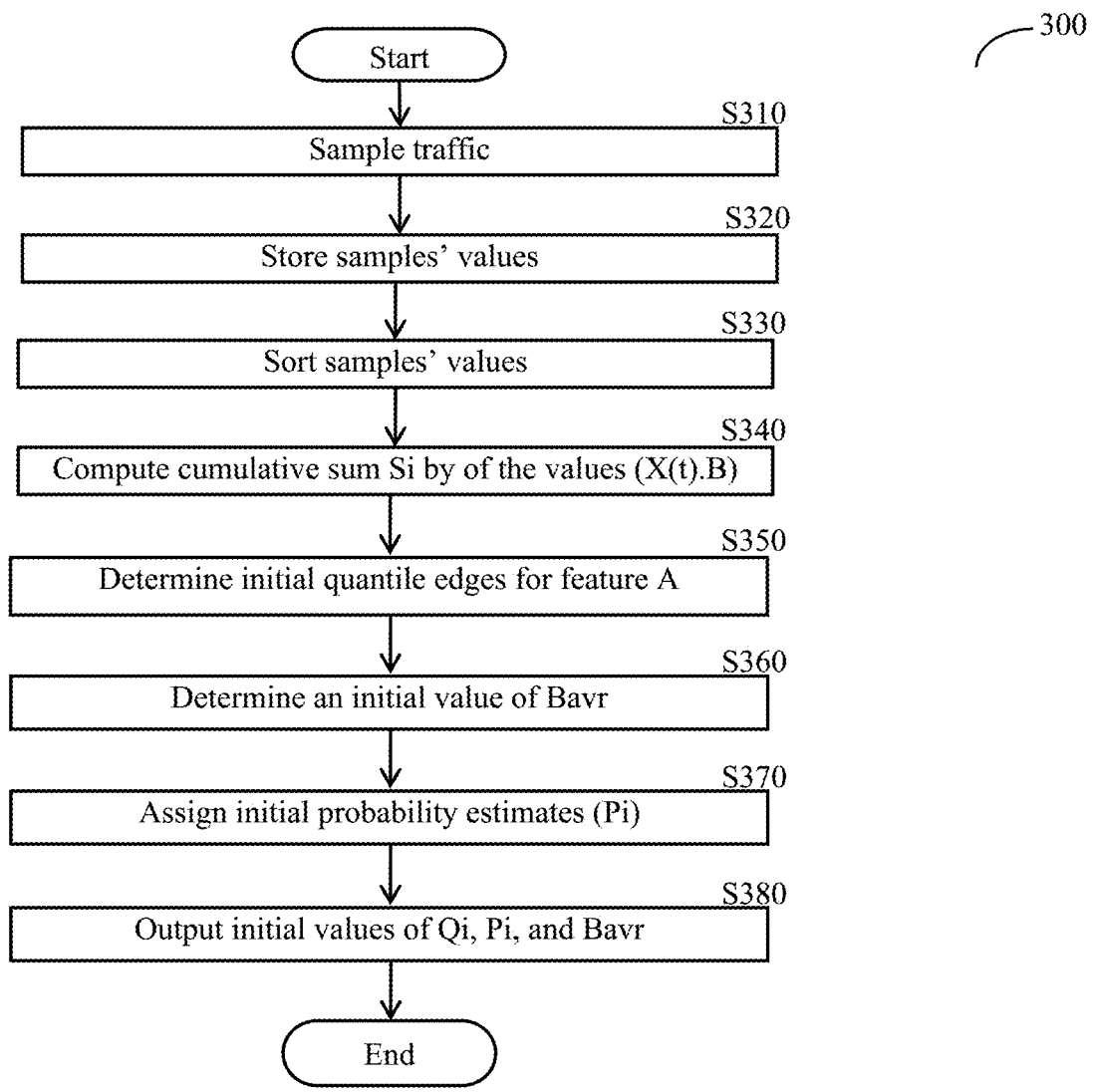
FIG. 3 is a flowchart illustrating a method of operation of the learning phase of the quantile regression analysis according to an embodiment.

FIG. 3 shows an example flowchart 300 illustrating a method of operation of the learning phase of the quantile regression analysis according to an embodiment. In the learning phase, an initial value of each quantile edge is predefined.

At S310, traffic is sampled to receive a number of samples M. The number of samples M is based on the number of quantiles N, wherein M and N are each integer numbers greater than 1. For example, a collection of M samples of M≅10000 are required for 100-200 quantiles to sample traffic of order of magnitude 100 MB/s.

At S320, values $X(t)\{t=0, 1, \ldots, M-1\}$ of the M samples are stored. In an embodiment, the values are stored in a 2-dimensional array, where one column of the array is used to store values of a first (also referred to as primary) feature A (X(t)·A) and the second column is used to store the values of a second (also referred to as secondary) feature B (X(t)·B), where the time argument t is a serial number (t=0, 1, . . . , M−1). In an embodiment, the feature A is an IP address of a packet and the feature B is a packet size of a bytes (B). When stored in the array, the value of a feature may be converted to an integer value. For example, an IP address can be converted to an integer number using a bit shift function. The values X(t) can be derived from a live data stream, a stored data stream, or a data stream fed from an external source. The disclosed embodiments are not limited to the source of the data stream or its nature.

At S330, the values of the first feature of the samples (X(t)·A) are sorted, for example, according to an ascending order. If some values (X(t)·A) are the same, they can be further sorted according to values of the feature B (X(t)·B). That is, in an embodiment, the rows of a 2-dimensional array that keeps X(t) are double sorted in ascending order, so that if i<j, then $X_i \cdot A < X_j \cdot A$, or $(X_i \cdot A = X_j \cdot A) \& (X_i \cdot B \ X_j \cdot B)$.

At S340, a cumulative sum $S_i$ is computed based on the values of the feature B in all M samples (X(t)·B) (cumulative sum on the $2^{nd}$ column only). A cumulative sum is a sequence of partial sums of a given sequence, here, of the feature B. The cumulative sum $S_i$ is computed as follows:

$$S_i = \sum_{j=0}^{i} B_j, \ 0 \le i \le M-1.$$

At S350, initial quantile edges for the first feature A are computed. To this end, the interval [0, $S_M$] is divided into N sub-intervals of approximately equal probability using a set of indexes that are defined as follows:

$$\begin{cases} i_0 = 0 \\ i_k = \underset{i}{\mathrm{argmin}}\left(\left|S_i - \frac{k-1}{N}S_M\right|\right), k = 1, 2, \ldots, N-1 \end{cases}$$

where, $S_M$ is the cumulative sum of a sample M (the last sample), N is the number of quantiles, and M is the number of samples.

Then, initial estimates of quantile edges ($Q_i$) are determined for the first feature A based on separators. The initial quantile edges are defined as follows:

$$\begin{cases} Q_0 = 0 \\ Q_k = A_{i_k}, k = 1, 2, \ldots, N-1. \\ Q_N = \infty \end{cases}$$

where, $A_{i_k}$ are N cutting values A of M defined using the above equation for every $0 \le i_k \le M-1$. The quantile edges are the boundaries of each quantile.

At S360, the initial estimate for the average value of the second feature B ($B_{avr}$) is determined as follows:

$$B_{avr}(0) = \frac{1}{M}S_{M-1}$$

the feature B, which in this example is the packet size, serves as a weight for the feature A.

At S370, initial probability estimates $P_i(0)$ are assigned to each quantile. In an embodiment, the initial probability estimate is based on the number of quantiles and may be determined as follows:

$$P_i(0) = \frac{1}{N}, \ i = 0, 1, \ldots, N-1.$$

At S380, the initial values of quantile edges ($Q_i$), probability estimates $P_i(0)$, and the $B_{avr}$ are output.

Figure 4:
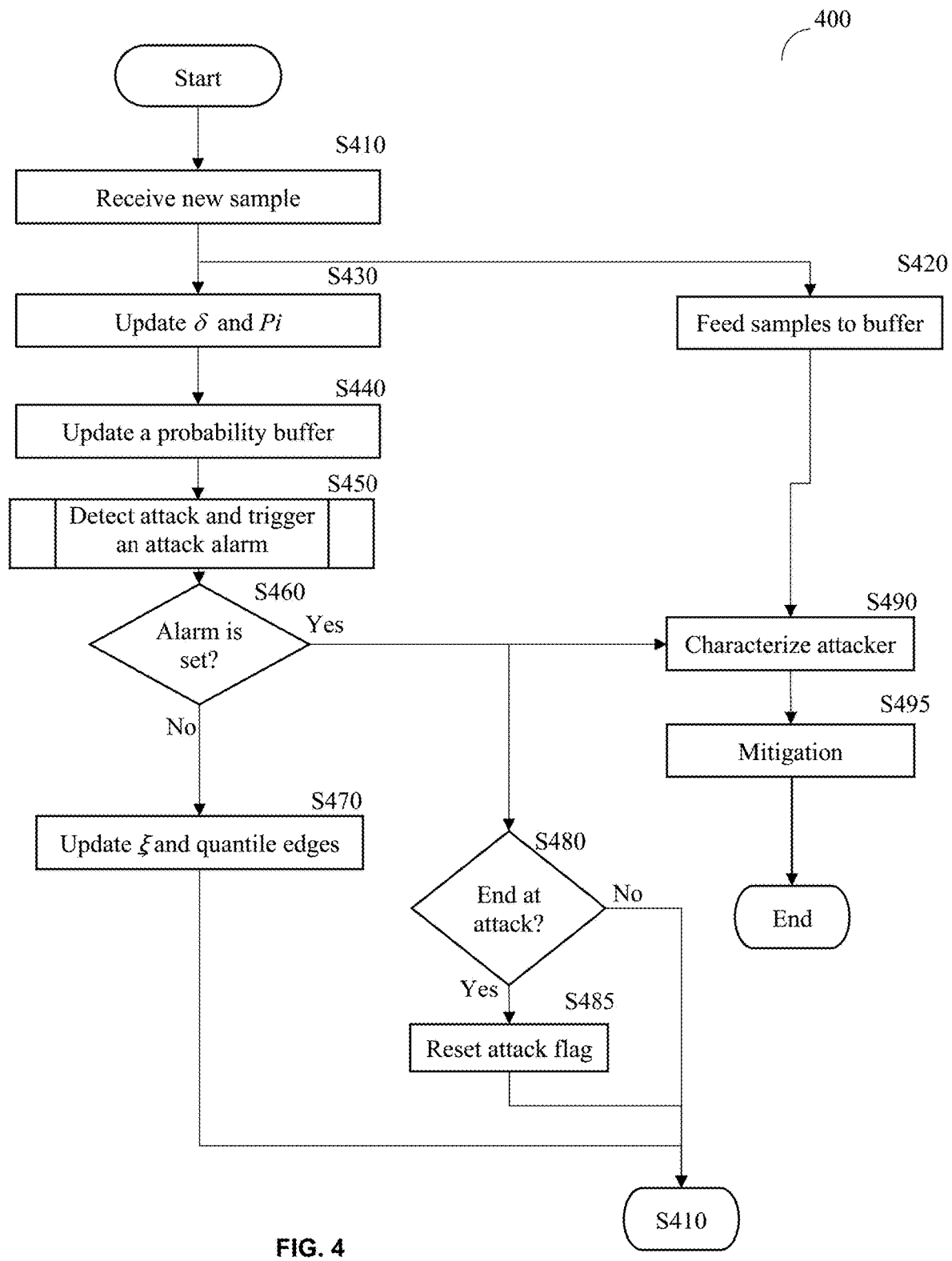
FIG. 4 is a flowchart illustrating a method of operation of the testing phase of the quantile regression analysis according to an embodiment.

FIG. 4 is an example flowchart 400 illustrating a method of operation of the testing phase of the quantile regression analysis according to an embodiment. Prior to executing the method, the quantile edges 'Q', probability estimates P, and factors δ and ξ are either learned or preset.

At S410, a new sample of incoming traffic is received. In an embodiment, the sample may be retrieved from a memory. It should be noted that multiple samples can be received and processed concurrently.

At S420, the received sample is fed into a data structure for future processing of the sample. The data structure, in an embodiment, is a First in First out (FIFO) circular buffer. The samples are placed in such a buffer to characterize an attacker of a detected attack when needed.

At S430, the increment for probability estimates δ and the probability estimates $P_i$, are updated based on the received sample. These updated values are used to determine the beginning and the end of the attack, and to characterize the attacker. S430 and S420 may occur at the same time.

To update the values of δ, and $P_i$ a number of steps should take place. First, the probability increment δ is computed. In an embodiment, the probability increment δ is computed as follows:

$$\delta = \frac{X(t) \cdot B}{B_{avr}(t-1)} \delta_0,$$

where, $$0 < \delta_0 \ll \frac{1}{N} \delta_0$$

is a predefined base value of the probability estimate increment and $$0 < \delta_0 \ll \frac{1}{N}.$$

The probability increment defines the changes in the probability estimates.

Then, a quantile is found such that a received sample falls between the edges of the quantile. Such a quantile is referred to as a "hit quantile". In an embodiment, an index n of a hit quantile is defined as follows:

$$n: Q_n(t) \leq X(t) \cdot A < Q_{n+1}(t),$$

where, $X(t) \cdot A$ is the first value of the received sample.

The probability estimates are updated as follows:

$$\begin{cases} P_n(t) = (1-\delta)P_n(t-1) + \delta \\ P_i(t) = (1-\delta)P_i(t-1), \quad i \neq n \end{cases}.$$

where, $P_n(t)$ is the probability estimate of the hit index, and $P_i(t)$ are the probability estimates of all quantiles, but the hit quantile. The values of $\delta$ and $P_i$ are determined at S430.

At S440, a probability buffer is updated with the computed probability estimates $P_i(t)$. In an embodiment, such a buffer is a FIFO circular buffer. The probability estimates are updated in the buffer with each new sample.

At S450, it is checked if the average probability estimate $P_i(t)$ of at least one quantile (estimated upon values in the probability FIFO circular buffer) has increased to cross a predefined threshold ($T_b$). And is so, so as to trigger an attack alarm. If so, a cyber-attack is detected, the attack alarm is triggered. When under attack, the probability estimate $P_i(t)$ in one or more quantiles may increase and eventually exceed a predefined threshold. If an n-th quantile is attacked with an intensity that is $F_a$ times greater than normal traffic (i.e., total traffic increased by $(1+F_a)$ times), then after $\tau$ samples the estimated values of probability are:

$$E[P_n(t)] = \frac{NF_a + 1}{NF_a + N} - (1-\delta)^{\tau}\left(\frac{NF_a + 1}{NF_a + N} - P_n(t-\tau)\right)$$

In an embodiment, as both the initial value of the pre-attack probability estimate $P_n(t-\tau)$ and the actual value at the time of observation $P_n(t)$ are random, the value compared to the threshold is the sum of predefined number K of recent computed probability estimates. In an example embodiment, the predefined number may be tens or hundreds of values. If the sum exceeds at least a predefined threshold (Tb), the ALARM state is triggered, and the corresponding quantiles are flagged as the attacked quantiles.

In embodiment, the threshold ($T_b$) is based on a required detection sensitivity. The sensitivity may be defined by a user or may be based on the lower detectable attack intensity factor $F_a$. In an embodiment, the threshold ($T_b$) may be defined as follows:

$$\frac{K}{N} < T_b = (1.5 \ldots 2)\frac{K}{N} < \frac{K}{N}\frac{NF_a + 1}{F_a + 1}$$

Where, K is the length of the probability estimates buffer and $F_a$ is a lower detectable attack factor predefined based on the requirement that $(F_a > 1/N)$, and N is the number of quantiles.

At S460, it is checked if the alarm flag is set (i.e., there is an on-going attack). If so, execution continues with S480 and S490; otherwise, execution proceeds to S470.

The method continues with S490, where an attacker of the detected attack is characterized. The characterization is performed within a time window since the attack is detected. The duration of such a time window is determined based on the size of the samples buffer. In an embodiment, the attack or attacker characterization includes fetching from the buffer samples related to the affected quantiles (quantiles demonstrating attack behavior), grouping the sizes (feature B) of the fetched samples with the same IP address, and ordering the IP addresses in descending order of their cumulative size, and declaring either a few of the most contributing IP addresses, or the shortest contiguous range of IP addresses having aggregate size exceeds a predefined threshold of the total, as a suspect list. As an example, such threshold may be defined as much as 50%, or be dependent on the excess of the probability estimate over the peacetime mean (1/N).

At S495, one or more mitigation actions are performed based on the characterization of the attacker. A mitigation action may include blocking traffic from an identified attacker, rate limiting the attack traffic, forwarding the attack traffic to a scrubbing center, and the like. In an example embodiment, after performing the mitigation action, the execution may proceed to S480, where it is checked if the attack ended.

When S460 yields a positive answer (i.e., the alarm is set), then at S480, it is further checked if a previously detected attack has ended. In an embodiment, the end-of-attack detection is based on the principle that, after an attack, the probability estimate of an affected quantile(s) exponentially descends to its peacetime level 1/N. This may be the case regardless of the intensity of the attack.

In an embodiment, when the following condition is satisfied, the attack ends:

$$t:\left(P_n(t-\tau) - \frac{1}{N}\right)\left(P_n(t) - \frac{1}{N}\right) > e^{\theta \delta_0 \tau},$$

The value of $P_n(t)$ is determined as follows:

$$\mathbb{E}[P_n(t)] = \frac{1}{N} + \left(P_n(t-\tau) - \frac{1}{N}\right)e^{-\delta_0 \tau}.$$

Therefore, it is sufficient to compare two distant enough samples with known index difference $\tau$ to conclude that the attack is over. In an example embodiment, the following values are utilized $\tau=100-500$, $\theta=0.90-1.10$, and $0<\delta_0\ll1/N$. It should be noted that the value $\exp(\theta\delta_0\tau)$ is a constant value invariant to attack or traffic intensity. If the end-ofattack is detected, at S485 the attack flag is reset, thereby, peacetime (no ongoing attack) is declared. Then, execution returns to S410.

When S460 yields a negative answer (i.e., there is no ongoing attack), at S470, the new sample is utilized to update the learned data set, and in particular the quantile edges. In an embodiment, only quantiles affected by attacks are updated provided that a probability estimate of a quantile exceeds its expected value 1/N. In such a case, the hit quantile defined above is narrowed as follows:

$$\begin{cases} \xi = \psi \max\left(1 - \frac{1}{NP_n(t)}, 0\right) \\ Q_n(t) = Q_n(t-1) + \xi(A - Q_n(t-1)), & 1 < n \le N-1 \\ Q_n(t) = Q_n(t-1) = 0, & n = 0 \\ Q_{n+1}(t) = Q_{n+1}(t-1) + \xi(A - Q_{n+1}(t-1)), & 1 < n \le N-1 \\ Q_{n+1}(t) = Q_{n+1}(t-1) = \infty, & n = N \\ Q_i(t) = Q_i(t-1), & i \ne n, n+1 \end{cases}$$

where $0 < \psi < 1$ and A is X(t). A. In an embodiment, p is a predefined value.

It should be noted that, if $P_n(t) < 1/N$, then quantile edges are not updated. Otherwise, if the hit quantile is not the first or last, then it is narrowed by the factor $1-\xi$. Narrowing of the outer quantiles depends on the distance of A to $Q_1$ or $Q_n$, correspondingly.

In an embodiment, during peacetime, the average size of the second feature B is also updated based on the value of feature B as follows:

$$B_{avr}(t) = (1-\alpha)B_{avr}(t-1) + \alpha X(t) \cdot B$$

where $0 < \alpha << 1$ is a predefined fading factor.

Figure 5:
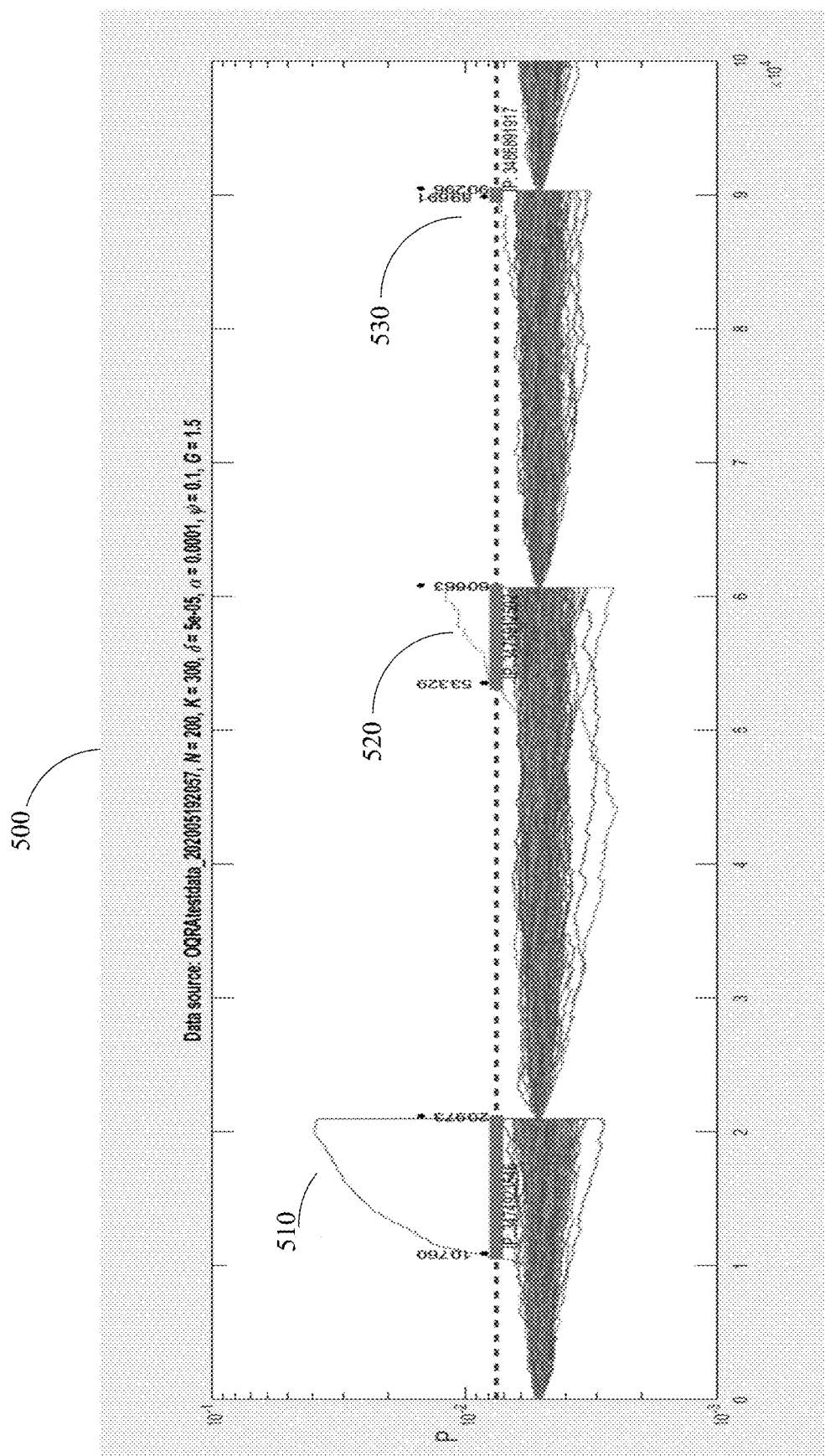
FIG. 5 is a chart demonstrating the detection of a cyber-attack generated using short burst traffic according to an embodiment.

FIG. 5 is an example chart 500 demonstrating the detection of a cyberattack generated using short burst traffic according to an embodiment. The chart 500 shows the changes in the probability estimates (P) in response to samples. The detection system in the example of FIG. 5 is configured with 200 quantiles. The detection threshold in the example is set to 1.5/N.

In the example shown in FIG. 5, three (3) bursts of traffic carry the attack. The first burst, labeled as 510, includes 10000 samples of incoming traffic. The first burst increases in the probability estimate of quantile 'n', where the attack start and end are indicated on the chart. As can be shown, when the attack ends, the probability estimate is reassigned to a 1/N. value. The attack intensity is 5%. This means that about 9520 samples out of 10000 represented normal traffic, and only about 480 are associated with a detected attack. That is, the attack added about 5% to the normal traffic.

The second burst, labeled as 520, began at the sample with a serial number 50000; it had a duration of 10000 samples of the incoming traffic causes increases in the probability estimate of quantile 'n', where the attack start and end are indicated on the chart. As can be shown, when the attack ends, the probability estimate drops sharply to a 1/N value. This attack added about 1% to the normal traffic.

The third burst, labeled as 530, began at the sample with a serial number 80000 and lasted for 10000 samples of the incoming traffic causes increases in the probability estimate of quantile 'k', where the attack start and end are indicated on the chart. As can be shown, when the attack ends, the probability estimate drops sharply to a 1/N value. The attack intensity was 0.5%, that is, about 0.5% of the traffic was added by the attack.

The first burst '510' was detected and characterized after the first 760 samples (attacker's IP address in a decimal notation: 3474923546). In the second burst, the attacker IP is 3475912502; and for the third burst the attacker IP address is 3486891917.

Figure 6:
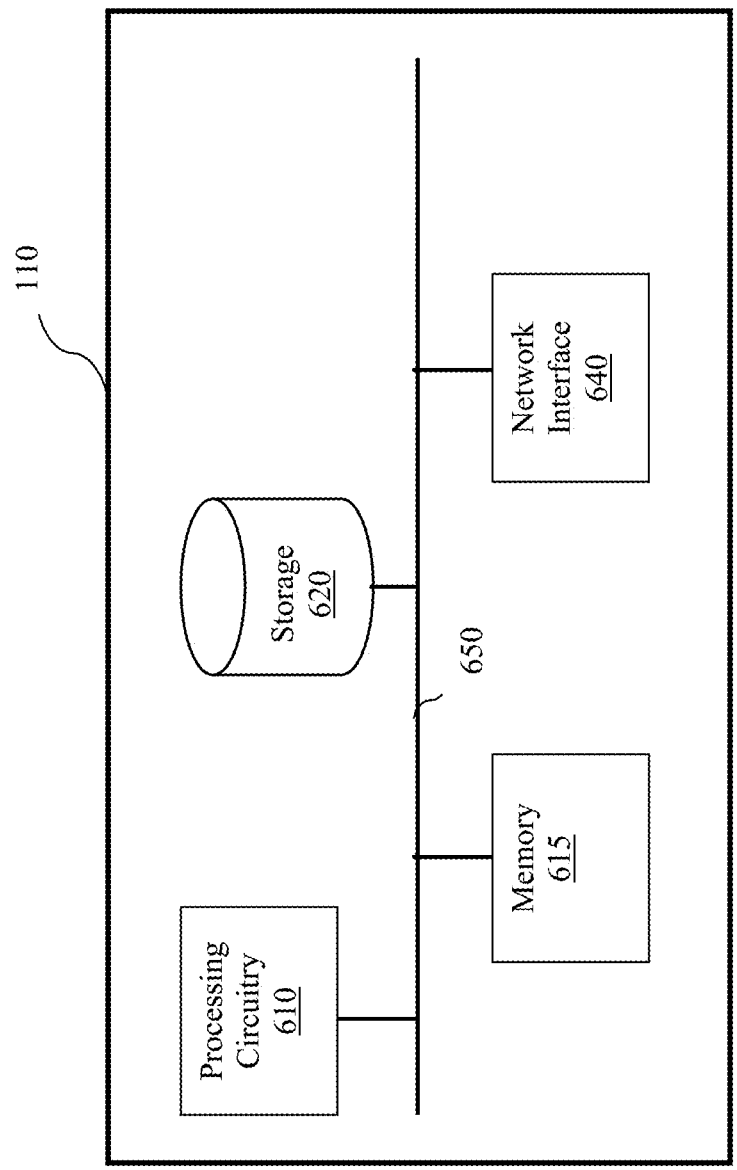
FIG. 6 is a block diagram of the defense system implemented according to an embodiment.

FIG. 6 is an example block diagram of the defense system 110 implemented according to an embodiment. The defense system 110 includes a processing circuitry 610 coupled to a memory 615, a storage 620, and a network interface 640. In another embodiment, the components of the defense system 110 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 615 may be volatile (e.g., RAM, etc.), non-volatile (e.g., ROM, flash memory, etc.), or a combination thereof. In one configuration, computer readable instructions to implement one or more embodiments disclosed herein may be stored in the storage 620.

In another embodiment, the memory 615 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 610 to perform the various processes described herein. Specifically, the instructions, when executed, cause the processing circuitry 610 to perform the embodiments described herein.

The storage 620 may be magnetic storage, optical storage, and the like, and may be realized, for example, as flash memory or other memory technology, CD-ROM, Digital Versatile Disks (DVDs), or any other medium which can be used to store the desired information. The storage 620 may include workflow schemes as described herein.

The processing circuitry 610 is configured to detect and cause mitigation of HTTPS flood attacks, and any encrypted DDoS attacks, as described herein. The network interface 640 allows the defense system 110 to communicate at least with the servers and clients. The embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

What is claimed is:

1. A method for detecting cyber-attacks, comprising:
   identifying at least one hit quantile out of a plurality of quantiles, wherein the at least one identified hit quantile falls within quantile edges of a sample of traffic directed at a protected entity, wherein each of the plurality of quantiles is characterized by a probability distribution of at least one feature of a data stream, each of the plurality of quantiles having a respective probability estimate;
   updating the probability estimates of the plurality of quantiles when the at least one hit quantile has been identified; and
   when the probability estimate of the at least one hit quantile is above a threshold, taking an action to mitigate existence of a cyber-attack.

2. The method of claim 1, wherein the data stream is divided into the plurality of quantiles based on a first feature of each of the plurality of quantiles such that a sum of a second feature of each of the plurality of quantiles at each time interval demonstrates a substantially same probability.

3. The method of claim 2, wherein the first feature is an Internet Protocol (IP) address and the second feature is an attribute related to bandwidth.

4. The method of claim 2, wherein updating the probability estimates of the plurality of quantiles further comprises:
   updating an average of the second feature; and
   updating a probability buffer with last known history probability estimates.

5. The method of claim 2, wherein identifying the hit quantile further comprises:
   determining if a value of the first feature is within the quantile edges of a first quantile of the plurality of quantiles, wherein the hit quantile is identified as the first quantile for which the value of the first feature is within the quantile edges of the first quantile.

6. The method of claim 1, wherein the probability estimate of each quantile is a probability that the quantile receives a byte from the traffic directed to the protected entity.

7. The method of claim 1, further comprising:
   setting the threshold based on at least a lower detectable attack intensity factor.

8. The method of claim 1, further comprising:
   characterizing an attacker of the cyber-attack wherein characterizing the attacker further comprises generating a suspected list of IP addresses from which comes a most contribution to an increased bandwidth during the cyber-attack.

9. The method of claim 1, further comprising:
   updating, during peacetime, the quantile edges of each of the plurality of quantiles.

10. A non-transitory computer readable medium having stored thereon instructions for causing a processing circuitry to execute a process for detecting cyber-attacks, the process comprising:
    identifying at least one hit quantile out of a plurality of quantiles, wherein the at least one identified hit quantile falls within quantile edges of a sample of traffic directed at a protected entity, wherein each of the plurality of quantiles is characterized by a probability distribution of at least one feature of a data stream, each of the plurality of quantiles having a respective probability estimate;
    updating the probability estimates of the plurality of quantiles when the at least one hit quantile has been identified; and
    when the probability estimate of the at least one hit quantile is above a threshold, taking an action to mitigate existence of a cyber-attack.

11. A system for detecting cyber-attacks, comprising:
    a processing circuitry; and
    a memory, the memory containing instructions that, when executed by the processing circuitry, configure the system to:
    identify at least one hit quantile out of a plurality of quantiles, wherein the at least one identified hit quantile falls within quantile edges of a sample of traffic directed at a protected entity, wherein each of the plurality of quantiles is characterized by a probability distribution of at least one feature of a data stream, each of the plurality of quantiles having a respective probability estimate;
    update the probability estimates of the plurality of quantiles when the at least one hit quantile has been identified; and
    when the probability estimate of the at least one hit quantile is above a threshold, take an action to mitigate existence of a cyber-attack.

12. The system of claim 11, wherein the data stream is divided into the plurality of quantiles based on a first feature of each of the plurality of quantiles such that a sum of a second feature of each of the plurality of quantiles at each time interval demonstrates a substantially same probability.

13. The system of claim 12, wherein the first feature is an Internet Protocol (IP) address and the second feature is an attribute related to bandwidth.

14. The system of claim 12, wherein updating the probability estimates of the plurality of quantiles further comprises:
    updating an average of the second feature; and
    updating a probability buffer with last known history probability estimates.

15. The system of claim 12, wherein the system is further configured to:
    determine if a value of the first feature is within the quantile edges of a first quantile of the plurality of quantiles, wherein the hit quantile is identified as the first quantile for which the value of the first feature is within the quantile edges of the first quantile.

16. The system of claim 11, wherein the probability estimate of each quantile is a probability that the quantile receives a byte from the traffic directed to the protected entity.

17. The system of claim 11, wherein the system is further configured to:
    set the threshold based on at least a lower detectable attack intensity factor.

18. The system of claim 11, wherein the system is further configured to:
    characterize an attacker of the cyber-attack wherein characterizing the attacker further comprises generating a suspected list of IP addresses from which comes a most contribution to an increased bandwidth during the cyber-attack.

19. The system of claim 11, wherein the system is further configured to:
    update, during peacetime, the quantile edges of each of the plurality of quantiles.

\* \* \* \* \*